No. 12,486. REISSUED MAY 22, 1906.
T. M. GALLAGHER.
BODY BOLSTER.
APPLICATION FILED JAN. 15, 1906.
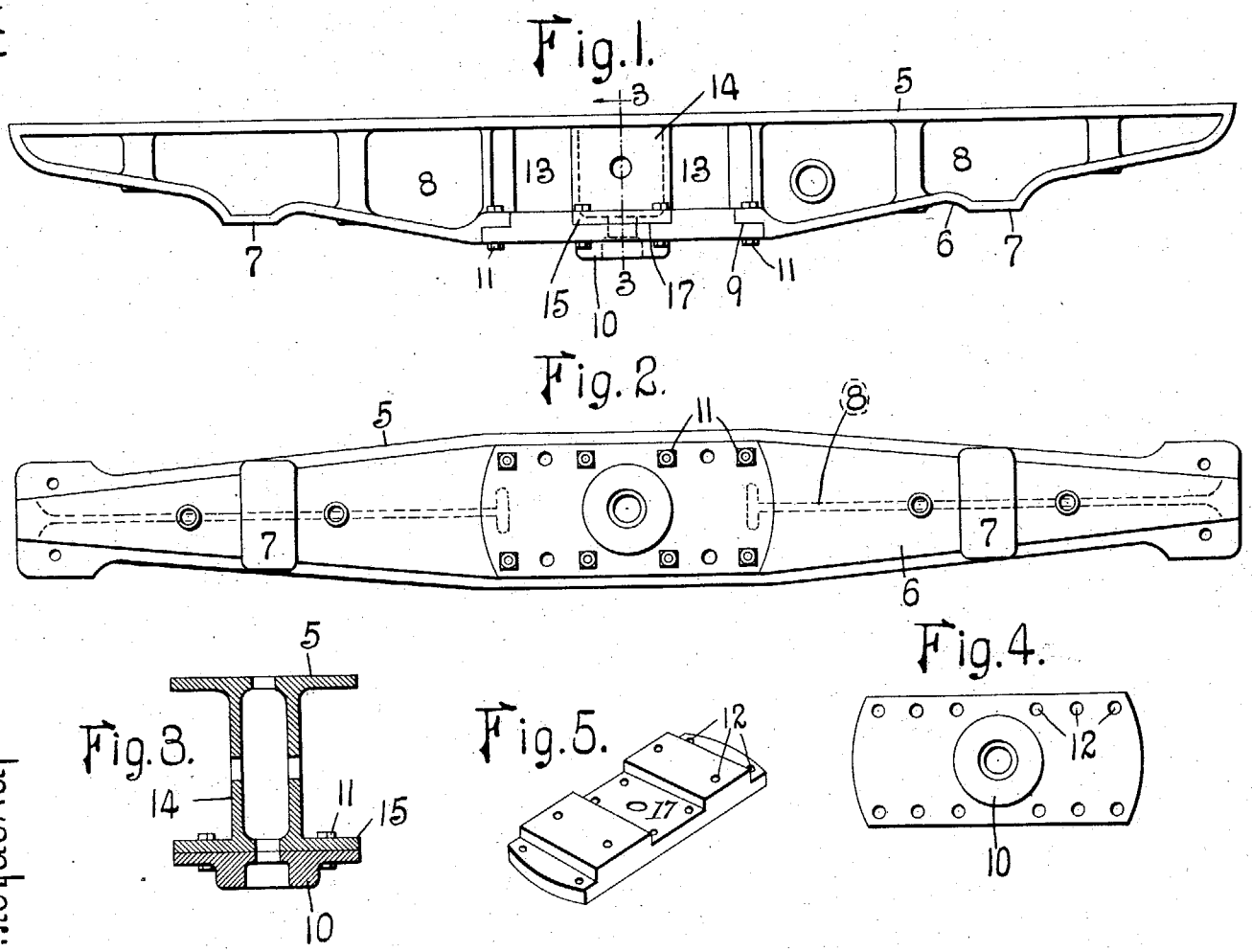
Witnesses
Edgar J. Farmer
Nelle L. Church.
Inventor:
Thomas M. Gallagher
by Bakewell & Cornwall
Att'y's.

UNITED STATES PATENT OFFICE.

THOMAS M. GALLAGHER, OF OLD ORCHARD, MISSOURI, ASSIGNOR TO SCULLIN-GALLAGHER IRON & STEEL COMPANY, OF ST. LOUIS, MISSOURI, A CORPORATION OF MISSOURI.

BODY-BOLSTER.

No. 12,486. Specification of Reissued Letters Patent. Reissued May 22, 1906.

Original No. 805,193, dated November 21, 1905. Application for reissue filed January 15 1906. Serial No. 296,236.

*To all whom it may concern:*

Be it known that I, THOMAS M. GALLAGHER, a citizen of the United States, residing at Old Orchard, county of St. Louis, State of Missouri, have invented a certain new and useful Improvement in Body-Bolsters, of which the following is a full, clear, and exact description, such as will enable others skilled in the art to which it appertains to make and use the same, reference being had to the accompanying drawings, forming part of this pecification, in which—

Figure 1 is a side elevation of one form of bolster embodying my invention. Fig. 2 is an inverted plan of the same. Fig. 3 is a cross-section taken on the line 3 3 of Fig. 1. Fig. 4 is a bottom plan view of the removable combined compression-plate and center-bearing detached from the bolster, and Fig. 5 is a top plan view of said plate.

My invention relates to bolsters for railway-cars; and it consists in the novel construction hereinafter specified and claimed.

The object of my invention is to provide an improved body-bolster which will permit the removal or renewal of the draft-timbers without removing the bolster from the car.

The further object of my invention is to provide a bolster with an improved compression and center plate which shall be so constructed that it will be retained in the recess in the bottom of the bolster even should its bolts become loose and drop out.

The further object is to provide an improved bolster with a compression-plate recess having curved or circular walls whereby the corresponding curved surfaces of the compression-plate will engage the projecting walls of the said recess and prevent straining or shearing of the compression-plate bolts.

5 indicates the tension member of the bolster, and 6 the compression member thereof, the latter having the usual side bearings 7.

The bolster preferably has the customary I-beam cross-section, the numeral 8 representing the web thereof. The bolster is provided in its under side with a compression-plate recess 9, the vertical walls of which are curved laterally of the bolster. The walls of said recess should be accurately bored or turned in order to fit the correspondingly-shaped combined compression-plate and center-bearing, the ends of which are curved to fit said curved walls of said recess whereby said compression-plate and bolster are interlocked so that movement of the compression-plate transversely of the bolster is prevented. The said compression-plate and center-bearing 10 when in position will be securely held in place by the weight imposed upon it and may be successfully run without any fastening-bolts, although I have shown a series of fastening-bolts 11, passing through the holes 12 in said plate and through corresponding holes in the compression member of the bolster. Yet should these bolts become loose and drop out no damage will be done, as the said plate will be retained in its circular recess by the curved projecting walls thereof. These curved projecting walls also take all the strain off of the bolts 11 and will positively prevent shearing of the bolts when the car carrying the bolster is heavily "bumped" by cars or engines. The strain or side thrust is taken almost entirely by the curved walls of the said circular seat. In a plane above the compression-plate recess 9 are the usual draft-timber recesses.

In placing or removing the draft-timbers it will only be necessary to detach the compression-plate 10, when the draft-timbers can be moved as desired within the sill-recess 13, formed in the under side of the bolster, without even removing the draft-timber bolts, and in no case will it be necessary to remove the bolster from the car in order to repair or replace the draft-timbers.

14 indicates the central part of the bolster, which projects downwardly from the tension member 5 at approximately the center of the sill-recess 13, so that a recess is provided for each draft-timber, and said portion 14 is provided with laterally-projecting flanges 15, and these flanges fit in a recess 17, formed in the upper face of the said combined compression-plate and center-bearing. Accordingly the central portion of the compression-plate, as well as the end portions thereof, interlock with the bolster, so that it is impossible for the compression-plate to rotate relatively to the bolster.

Having thus described the invention, what is claimed as new, and desired to be secured by Letters Patent, is—

1. The improved cast-metal bolster, having in its under side the usual sill-recess and recess for the removable compression-plate, the vertical walls of said compression-plate recess being curved; substantially as described.

2. The improved cast-metal bolster, having in its under side the usual sill-recess and recess for the removable compression-plate, the vertical walls of said compression-plate recess being curved, and a combined compression-plate and center-bearing having its ends curved and located within the said compression-plate recess; substantially as described.

3. The improved cast-metal bolster, having in its under side the usual sill-recess and recess for the removable compression-plate, the vertical walls of said compression-plate recess being curved, and a combined compression-plate and center-bearing, having curved ends, which are located within said compression-plate recess at a point exterior of the outer walls of the said sill-recess, said compression-plate itself being recessed upon its upper side to receive the flanged central part of the bolster; substantially as described.

4. A bolster having a sill-recess, and a compression member closing said recess and interlocking at its ends with said bolster whereby said compression member is prevented from moving transversely of the bolster; substantially as described.

5. A bolster having a sill-recess, and a compression member closing said recess and interlocking at its center with said bolster so that rotary movement of said member relatively to the bolster is prevented; substantially as described.

6. A bolster having a sill-recess, and a compression member closing said recess and interlocking at its center, the ends of said compression member interlocking with the bolster to prevent said member from moving transversely of the bolster; substantially as described.

7. A bolster provided at its under side with a sill-recess, a compression member closing said recess, and coöperating non-circular parts on said bolster and compression member at approximately the centers thereof for preventing said member from rotating relatively to the bolster; substantially as described.

8. A bolster provided at its under side with a sill-recess, and a compression member closing said recess and having its ends engaging portions of said bolster, the ends of said member being so formed that said member cannot move transversely of the bolster; substantially as described.

9. A bolster provided at its under side with a sill-recess, a compression member closing said recess and provided with a center-bearing, securing means for holding said compression member in position, and interlocking parts on the bolster and the ends of the compression member which relieve said securing means from longitudinal strains; substantially as described.

10. A bolster provided at its under side with sill-recesses, a compression-plate closing said recesses and provided with a center-bearing, and a non-circular part on the bolster intermediate said recesses which coöperates with a portion on the compression-plate to prevent rotary movement thereof; substantially as described.

11. A bolster provided at its under side with a sill-recess, and a compression-plate located under said recess and provided with a center-bearing, the ends of said plate and the walls of said recess being so formed that said plate cannot move transversely of the bolster; substantially as described.

12. A bolster provided with a sill-recess, a combined compression-plate and center-bearing located under said recess and having its ends interlocking with the end walls of the recess, and coöperating means on said plate and bolster at approximately the centers thereof for preventing said plate from rotating; substantially as described.

In testimony whereof I hereunto affix my signature, in the presence of two witnesses, this 12th day of January, 1906.

THOMAS M. GALLAGHER.

Witnesses:

AL. T. SMITH,

T. E. GALLAGHER.